United States Patent [19]

Kitamura et al.

[11] Patent Number: 5,780,779
[45] Date of Patent: Jul. 14, 1998

[54] GRANULE GATE AND GRANULE WEIGHING MACHINE INCORPORATING THE SAME

[75] Inventors: Masao Kitamura, Kyoto; Hiroyuki Fujimoto, Ikeda, both of Japan

[73] Assignee: Kyoji Co., Ltd., Japan

[21] Appl. No.: 709,821

[22] Filed: Sep. 10, 1996

[30] Foreign Application Priority Data

Sep. 11, 1995 [JP] Japan .................. 7-259226

[51] Int. Cl.⁶ .................. G01G 13/18; G01G 13/02
[52] U.S. Cl. .................. 177/105; 177/108; 177/120; 222/561; 222/502
[58] Field of Search .................. 198/532; 222/502, 222/504, 561, 564; 177/59, 98, 99, 100, 105, 108, 116, 119, 120

[56] References Cited

U.S. PATENT DOCUMENTS

| | | | |
|---|---|---|---|
| 3,124,206 | 3/1964 | Burke | 177/105 |
| 3,181,739 | 5/1965 | Dye | 222/502 |
| 3,506,111 | 4/1970 | Eppenberger | 177/116 |
| 4,136,804 | 1/1979 | Kinzler et al. | 222/564 |
| 4,219,136 | 8/1980 | Williams et al. | 222/561 |
| 4,271,011 | 6/1981 | Spencer et al. | 222/564 |
| 4,776,493 | 10/1988 | Tegel | 222/502 |
| 5,095,961 | 3/1992 | Nakagawa | 222/561 |
| 5,111,976 | 5/1992 | Ban | 222/502 |
| 5,449,095 | 9/1995 | Kobayashi | 222/564 |
| 5,493,852 | 2/1996 | Stewart | 222/561 |

*Primary Examiner*—Michael L. Gellner
*Assistant Examiner*—Randy W. Gibson
*Attorney, Agent, or Firm*—Finnegan, Henderson, Farabow, Garrett, & Dunner, L.L.P.

[57] ABSTRACT

A gate for supplying granule to and removing it from the other apparatus. Which comprises: a drive source (2); a fixed gate (6) having multiple feeder holes arranged such that granule can pass through; a movable gate (7) that is attached such that it can slide across the fixed gate (6) and is equipped with multiple openings (71) that have the same pitch as the feeder holes (61) on the fixed gate, and that allow granule to pass through when said openings (71) are aligned with said feeder holes; and a power transmission mechanism.

The granule gate lowers the height of the mounds of granule that accumulate in granule weighing machines (1). It can also entirely open and close feeding holes using a short stroke. The granule weighing machine (1) can be designed thin, so that the maximum quantity of granule to be weighed nearly matches the capacity of the weighing container (3).

6 Claims, 2 Drawing Sheets

GRANULE GATE AND GRANULE WEIGHING MACHINE INCORPORATING THE SAME

BACKGROUND OF THE INVENTION

1. Field of the Invention

This invention relates to a gate for supplying to and removing from weighing machines granule of rice, barley, coffee beans, or their powdered forms, and also relates to a granule weighing machine incorporating such a gate for measuring the weight of said granule. The granule weighing machine of this invention is suitable for the cumulative measurement of the weight of the granule of a nearly full weighing container. This machine is also suitable for the automatic weighing, by using electrical circuit to calculate load signal from load cell or differential transformer, then relaying the information to a control system and receiving, in turn, instructions from said control system, thereby automatically controlling the supply of specific quantity of granule.

2. Description of the Related Art

Conventional granule weighing machines has been generally comprised of a weighing container in which the granule undergoing weighing was contained, a hopper to put the granule in the weighing container, and a load cell or other equalizer. The lower end of the hopper has two feeder holes, one large and the other small. When such a conventional machine was used to weigh granule, the granule was first put through the large feeder hole into the weighing container. The gate was closed as soon as a little less than the specified quantity of granule had been put in. Next, the small feeder hole was opened and the granule was put in by multiple small or very small loads up to the specified amount.

As the granule was put into the weighing container through the hopper, the angle of repose of the granule caused the granule to accumulate in the form of a mountain, or mound, inside the weighing container. When the top of the mound of accumulated granule touched the bottom of the hopper, the contact pressure to the hopper affected the equalizer, causing a measurement error. It was therefore necessary to create weighing containers with considerably larger capacity than the maximum quantity of granule that must be weighed, so that the top of the granule mound did not come into contact with the bottom of the hopper.

Because the capacity of the weighing containers on conventional weighing machines needs to be increased so that the said weighing containers can contain more than the maximum quantity of granule to be weighed, either the horizontal area of the weighing containers would have to be expanded or the distance between the weighing containers and the bottom of the hopper would have to be made larger. Neither of these solutions will allow the weighing machine to be made smaller. Having to switch from the large to small feeder hole during weighing also necessarily disallowed the operation to be conducted in a short period of time.

SUMMARY OF THE INVENTION

The first objective of this invention, therefore, is to provide a granule gate that enables the height of the mound formed by accumulated granule to be lower and to provide a thin granule weighing machine in which the capacity of the weighing container nearly matches the maximum quantity of granule that is to be weighed. The second objective of this invention is to provide a granule weighing machine that can operate automatically and at high speed.

To achieve the above objectives, the granule gate of this invention incorporates a drive source, a fixed gate having multiple feeder holes arranged such that granule can pass through, a movable gate that is attached such that it can slide across the fixed gate, and a power transmission mechanism. The movable gate slides across the fixed gate, by using the driving force transmitted from the drive source by means of the power transmission mechanism. The movable gate also is equipped with multiple openings that have the same pitch as the feeder holes on the fixed gate and that allow granule to pass through when said openings are aligned with said feeder holes.

DETAILED DESCRIPTION OF THE INVENTION

Figure 1:
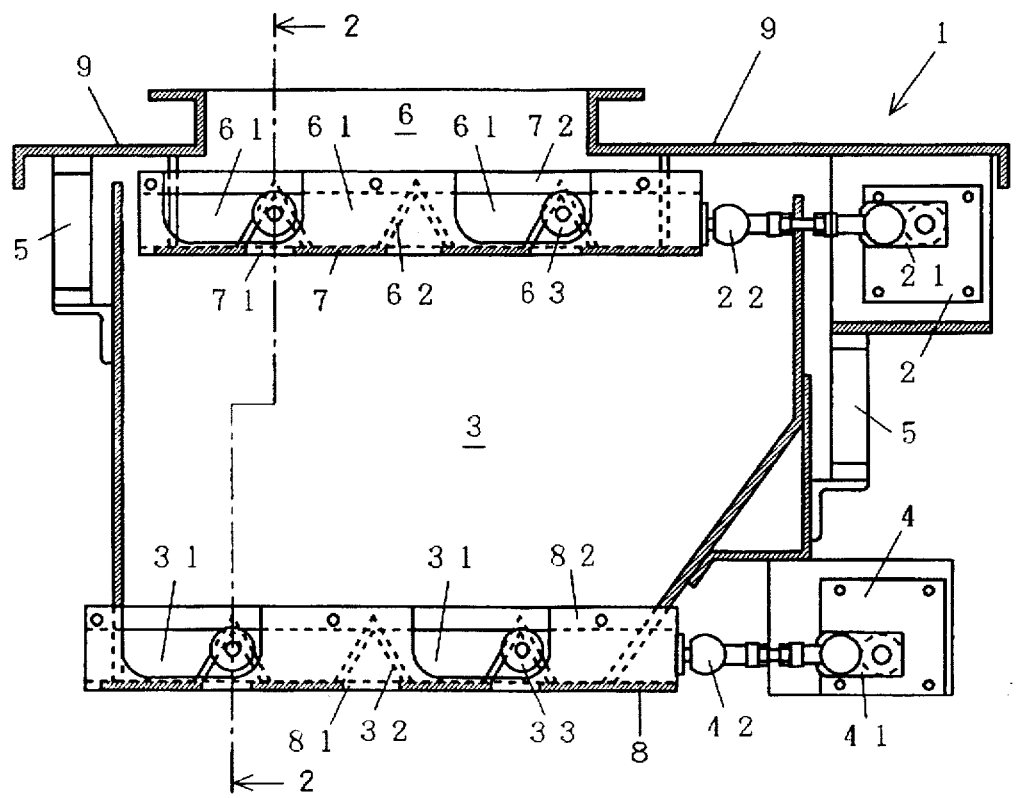
FIG. 1 shows a front view of the internal parts of the granule weighing machine of an actual embodiment of the invention.

When the granule gate of this invention is used, a fixed gate is attached to the bottom of a granule feeding device such as hopper. This fixed gate may also be a component of said granule feeding device. Granule is stored beforehand on the fixed gate. Next, the movable gate is made to slide, using the driving force transmitted from the drive source by means of the power transmission mechanism. When the feeder holes on the fixed gate align with the openings on the movable gate, the granule passes through the feeder holes. When the granule gate of this invention is applied for use in a weighing machine, if the granule gate is fixed above the granule weighing container, the granule that passes through the feeder holes is allowed to be fed into the weighing container.

The granule fed into the weighing container will accumulate into mounds, as explained above. The number of such mounds is, however, same as of feeder holes. The multiplicity of feeder holes results in the height of each mound being lower than the height of the mound accumulated inside the weighing container of conventional weighing machines.

Next, when the weighing container has become nearly full, such that the height of the granule contained within reaches the height of the feeder holes, the movable gate is made to slide out of alignment with the feeder holes, thereby closing said feeder holes. At this time, the peaks of the mounds of accumulated granule will be shaved off by the edges of the openings on the movable gate, filling in the valleys, or low-lying areas, that had formed around said mounds. The mounds, which are already lower than those of conventional machines, are therefore further flattened and leveled off. This results in a space being formed between the feeder holes and the granule within the weighing container. So even if granule is stuffed fully into the weighing container to the extent that they reach the feeder holes, the contact pressure does not affect on the equalizer, so accurate measurement can be achieved and the overall design of the weighing machine can be thin.

The granule gate of this invention has multiple feeder holes and openings, enabling the breadth of said feeder holes and openings to be small. This enables the feeder holes to be entirely opened and closed by sliding the movable gate only a distance equivalent to the breadth of the those small openings. Short moving distance enables fast opening and closing, eliminating the need for air cylinders and other long-stroke drive sources and making possible the use of easily controlled stepping motors or servo motors as the drive source. When such an arrangement is applied in a weighing machine, it enables control of the drive source based on the load signal from the load cell or other equalizer and on the calculation of predictive arithmetic circuit (constructed from an electric circuit or other means). This makes possible the weighing of specific quantity of granule by conducting only a single opening and closing operation.

The shape of the feeder holes and of the movable gate openings do not have to match precisely. The feeder holes can be square or rectangular, for example, and the movable gate openings trapezoidal, or vise-versa. Such an arrangement would result in the formation of triangular openings where the feeder holes and the movable gate openings overlap, just prior to the complete closing of the feeder holes. This enables a rapid decrease in the speed of the granule passing through the gate, allowing the quantity of the granule to be finely adjusted.

The minimum interval D between adjacent openings on the movable gate, however, should be wider than the maximum width d of the corresponding feeder holes. This ensures that when the movable gate openings are not overlapping with the feeder holes, the feeder holes are completely closed.

The method used for discharging granule from within the weighing container to outside the weighing container with the weighing machine of this invention is not limited to any one method. The discharge method can be such that, for example, the machine has a multiplicity of discharge holes on the bottom of the weighing container, with a second movable gate, having multiple openings that are arranged nearly identically to those of the discharge holes on the bottom of the weighing container, fixed to the bottom of the weighing container in such a way as to allow said movable gate to slide. When the openings of the second movable gate are aligned with the discharge holes at the bottom of the weighing container, the granule inside the weighing container passes through and are discharged to outside said weighing container. In such an arrangement, if the second movable gate is made to slide only the distance of the breadth of the discharge holes, just as with the feeder holes when the granule is fed into the weighing container, the discharge holes can be entirely opened and closed, enabling free control over the discharge speed in response to the capability of transporting granule outside the weighing container and load cell signals. This also makes possible continuous measurements during a short period of time, for such instances as when performing cumulative weighing, where the same weight is to be measured repeatedly and the sum of those measurements is used as the final weight. The granule that passes through the feeder holes (the discharge holes, when viewing it from inside the weighing container) are discharged outside the weighing container and, for example, supplied to a conveyor belt. This is one example of a suitable discharge method.

If, in the method of discharging granule explained above, the bottom of the weighing container also serves as the fixed gate, it can be considered as another form of the granule gate.

The feeder holes can be arranged in a straight line or a circular pattern. If arranged in straight line, the movable gate will slide forward and backward in the direction of said lines. In such a case, a linkage would serve well as the power transmission mechanism for the forward and backward linear movement, because such a device does not make any stroke errors. A pinion rack or ball screw would also serve the purpose. The movable gate will move smoothly if bearings are attached to the fixed gate and a rail is attached to the movable gate such that the rail runs over the bearings, enabling the sliding motion of the movable gate to be guided in the proper direction.

If the feeder holes are arranged in a circular pattern, the movable gate will slide in a rotating direction. In such a case, the drive motor can be fixed at the center of the movable gate rotation, enabling elimination of a power transmission mechanism. A reduction gear may be used as a power transmission mechanism, however, between the output shaft of the drive motor and the rotation shaft of the movable gate.

DESCRIPTION OF THE PREFERRED EMBODIMENTS

Example 1

Figure 2:
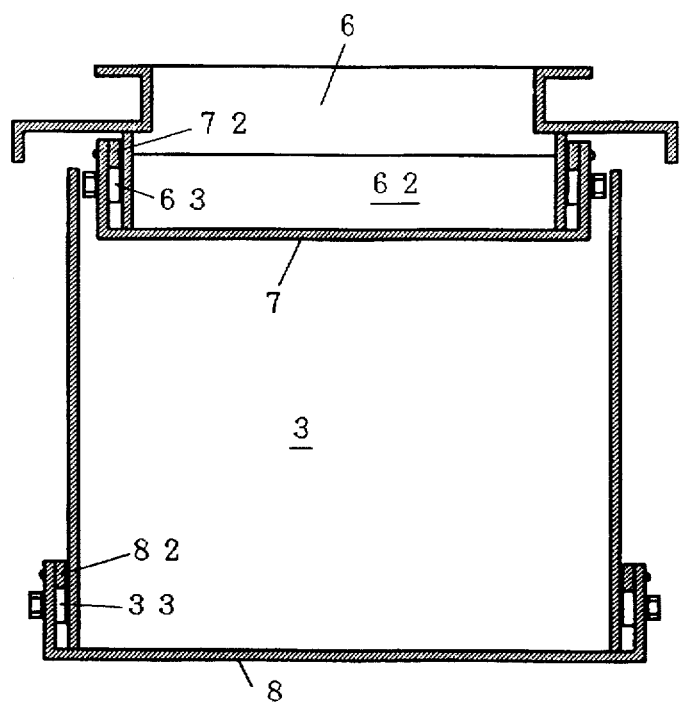
FIG. 2 is a 2—2 sectional view of FIG. 1.

The first embodiment of a weighing machine employing the granule gate of this invention will be explained along with the accompanying drawings. FIG. 1 is a front view of the internal part of weighing machine in the first embodiment. FIG. 2 is a 2—2 sectional view of FIG. 1. The weighing machine of this example has a movable gate that moves forward and backward in a linear direction in relation to the fixed gate. The drawings show the feeder holes of this machine having been closed off by the movable gate.

Weighing machine 1 incorporates a drive gear motor 2 for feeding granule, a weighing container 3, drive gear motor 4 for discharging granule, and two load cells 5. A frame 9 above the weighing container is fixed onto a hopper (not shown in the drawing) or a stand (not shown in the drawing). A fixed gate 6 having four feeder holes 61 in the form of long slits running from the front to the back of FIG. 1 and arranged in the left-to-right direction is attached to the frame 9. The area and pitch of each feeder hole is identical. The mask section 62 in between the two feeder holes 61 located next to each other is an inclined plane, so that the granule does not remain on the top but fall smoothly by their own weight. Two bearings 63 each are attached to both walls of the fixed gate 6 and attached such that they can rotate around a shaft.

The drive gear motor 2 for feeding granule is fixed to the frame 9 on the outside of the weighing container 3. A crank 21 is connected to the output shaft of the drive gear motor 2 and one end of a link 22 is coupled with the crank 21. The other end of the link 22 is coupled with the end of the movable gate 7. The crank 21 is designed such that its rotating radius is one-half the width of the feeder holes 61.

Movable gate 7 has four openings 71 that are aligned with the feeder holes 61 on the fixed gate 6 but have a slightly smaller width. Rails 72 are attached to the walls on both sides of the movable gate 7, contacting the said bearings 63 and sliding on these bearings. When the drive gear motor 2 is driven, the output makes the crank 21 revolve around its shaft, pulling the movable gate 7 as the link 22 recedes. The movable gate 7 moves toward the right of FIG. 1, sliding along the fixed gate 6 as its rails 72 are guided by the bearings 63. When the crank 21 has revolved 180° C., the openings 71 on the movable gate 7 and the feeder holes 61 are aligned and the feeder holes 61 are wide open. When the crank 21 revolves a total of 360° C. and returns to its original position, the feeder holes 61 are completely closed by the movable gate 7.

One of the load cells 5 is fixed to one side of the frame 9 and the other load cell is fixed to the other side of the frame, both load cells supporting the weight of the weighing container 3. In this embodiment, when the weight of the weighing container 3 increases because of granule being fed into it, the tensile load on the load cells 5 also increases and the change in tensile load is detected as a load signal.

The bottom of the weighing container 3 has long, slit-shaped discharge holes 31, like the feed holes 61, running from the front to the back of FIG. 1. There are two bearings 33 each which is attached to the bottom end of both the front and rear side of the weighing container. A second movable gate 8, having the same shape as the movable gate 7, is fixed to the bottom of the weighing container 3 such that the movable gate 8 is able to slide. A drive gear motor 4 for discharging granule is fixed to the weighing container 3 and its driving force is transmitted to the second movable gate 8 via a crank 41 and link 42. The mutual relationships regarding position and operation of the bottom of the weighing container 3, the second movable gate 8, the drive gear motor 4 for discharging granule, the crank 41, and the link 42 are respectively the same as for fixed gate 6, movable gate 7, drive gear motor 2 for feeding granule, crank 21, and link 22. So when the discharge holes 31 and the openings 81 on the movable gate 8 are aligned, the granule passes through the discharge holes 31 and is discharged from the weighing container.

As for the operation of weighing machine 1, rice or other granule is put into the weighing container 3 from the top of the fixed gate 6 by driving the drive gear motor 2, which in turn slides the movable gate 7 to the right (in FIG. 1), fully opening the feeder holes 61. The granule passes through the feeder holes 61 and are accumulated in the weighing container 3. The angle of repose of the granule itself results in the formation of mounds of granule directly below each of the feeder holes 61. Space created by low-lying areas is also formed directly below the mask areas 62.

When measuring as much granule as the weighing container 3 becomes nearly full (this would mean approx. 15 kg if the a weighing container designed for 15 kg is being used), the granule accumulates in the weighing container 3 until it nearly reaches the feeder holes 61. When the movable gate 7 returns to the closed position, the edges of its openings 71 shave off the tops of the mounds of granule that has accumulated, causing the granule to fall into the space around each mound. In this way, the top surfaces of the accumulated granule is leveled off. The load signals from the load cells are recorded under this condition. Then, drive gear motor 4 for discharging granule is driven, sliding the second movable gate 8 to the right (in FIG. 1) and fully opening the discharge holes 31. This allows the granule in the weighing container 3 to pass through the discharge holes 31 and be discharged from the weighing container. In a case where the final weight is to be 150 kg, the above operation is repeated nine times. In such a case, the cumulative weight W for the nine times of granule weighing is calculated and the difference between the final weight desired and the actual cumulative weight (150−W) is recorded in the control device.

Next, the feeder holes 61 are opened and granule is again supplied to the weighing container 3. When the specified weight, which is just less than the target value (150−W), has been attained in the weighing container, the load signal is detected by the control system (not shown in the drawing) and drive gear motor 2 is again driven to return the movable gate 7 to the position shown in the drawing, completely closing the feeder holes 61. The weight of the granule that passes through the feeder holes 61 per unit of time and the speed at which the movable gate 7 opens or closes can be calculated beforehand. According to the result of calculation, a switch operation can be set on the control system such that the weight of the granule which passes through the feeder holes 61 from the time the above load signal is issued until the feeder holes 61 are completely closed becomes the difference (150−W). After the total weight of the granule supplied to the weighing container 3 has been measured, the discharge holes 31 are fully opened and the granule is discharged. In this way, very close to 150 kg is weighed out through 10 rounds of cumulative weighing.

The weighing machine 1 of this actual embodiment has feeder holes 61 located in four places. The height of the accumulated granule mounds is never very high and the mounds are flattened by the edges of the openings 71 of the movable gate 7. This results in nearly the entire effective capacity of the weighing container 3 being occupied by granule and creates a space between the accumulated granule and the fixed gate 7, even if the weighing container 3 is stuffed full of granule to the vicinity of the edge of the feeder holes 61. Any contact pressure exerting undesirable effect on the load cells 5 will not be caused by the granule. This enables precise weighing and making possible a thin design for the weighing machine.

The weighing machine 1 has a fixed gate 6 and four feeder holes 61, enabling each of said holes, as well as each of the openings 71 on the bottom of the weighing container, to have a width that is approx. one-fourth that of the single feeder hole in conventional weighing machines. This, in turn, means that the feeder holes 61 can be fully opened and closed by sliding the movable gate 7, in relation to the fixed gate 6, only a distance equal to the width of these small openings 71. The gates can therefore be opened and closed quickly and the machine can employ the short-stroke link described above as the power transmission mechanism and can use a servo motor, which affords easy control, as the driving source. This enables control of the drive gear motor 2 for feeding granule based on the load signals from the load cells 5 and on the calculation of predictive arithmetic circuit (constructed from an electric circuit or other means), making possible the weighing of specific quantities of granule by conducting only a single opening and closing operation.

Example 2

Figure 3:
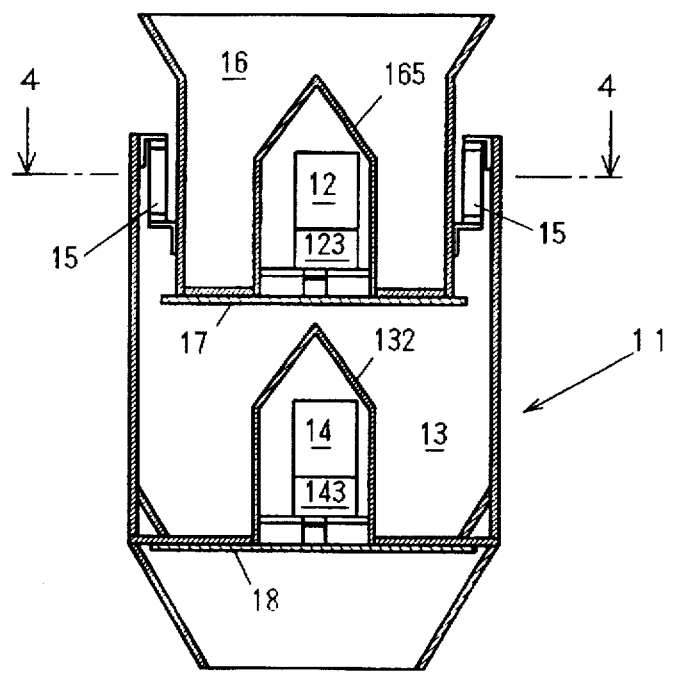
FIG. 3 shows a vertical sectional view of the granule weighing machine of another actual embodiment of the invention.
Figure 4:
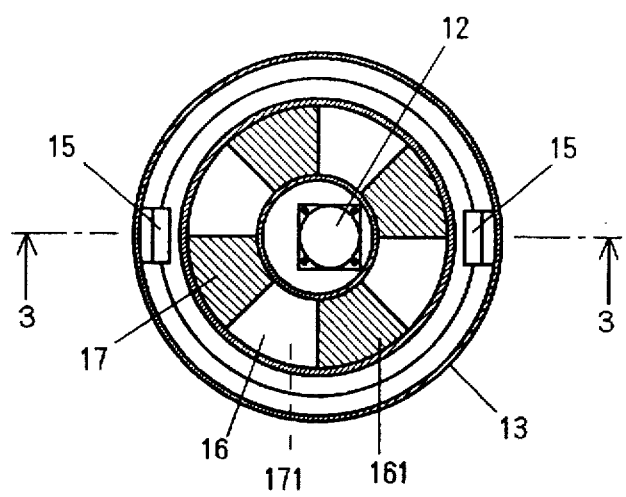
FIG. 4 is a 4—4 sectional view of FIG. 3.

The second embodiment of a weighing machine of this invention will be explained along with the accompanying drawings. FIG. 3 is a vertical sectional view of the second embodiment and FIG. 4 is a 4—4 sectional view of FIG. 3. Note that FIG. 3 is equivalent to a 3—3 sectional view of FIG. 4. The weighing machine of this actual embodiment has a movable gate that rotates in relation to a fixed gate. The drawings show the feeder holes of this machine having been closed off by the movable gate.

In this example, as well as the one above, the weighing machine 11 incorporates a drive gear motor 12 for feeding granule, a weighing container 13, drive gear motor 14 for discharging granule, and two load cells 15. A cylindrical fixed gate 16, located above the weighing container, has four feeder holes 161 radially located on its bottom side, and is attached to a hopper (not shown in the drawing) or to a stand (not shown in the drawing).

The drive gear motor 12 is fixed on the center axis of the fixed gate 16 and is protected by a cover 165. A gear head 123 with a built-in reduction gear is connected to the output shaft of the drive gear motor 12 and the center of movable gate 17 is connected to the output shaft of the gear head 123.

The movable gate 17 is a circular plate having four openings 171 that are approximately aligned with the feeder holes 161. When the drive gear motor 12 is driven, its output speed is reduced by the gear head 123 and its driving power is transmitted to the movable gate 17. This, in turn, makes the movable gate 17 rotate around its shaft, sliding across the fixed gate 16. When the movable gate 17 has rotated 45° C., the openings 171 are aligned with the feeder holes 161, fully opening said feeder holes 161. If the movable gate 17 is rotated a further 45° C. in the same direction, said movable gate 17 completely closes the feeder holes 161.

The load cells 15 are fixed to the outer periphery of the fixed gate 16, both load cells supporting the weight of the weighing container 13. In this embodiment, when the weight of the weighing container 13 increases because of granule being fed into it, the tensile load on the load cells 15 also increases and the change in tensile load is detected as a load signal.

The bottom of the weighing container 13 has discharge holes 131 (not shown in the drawing) located in the same radial pattern as the feeder holes 171. The second movable gate 18, which resembles movable gate 17 in shape but is somewhat larger, is attached to the bottom of the weighing container 13 such that it can slide across the bottom of said weighing container 13 in the same manner as movable gate 17 slides. The drive gear motor 14 is fixed on the center axis of the bottom of the weighing container 13, and its driving speed is reduced by the gear head 143 and its driving power is transmitted to the second movable gate. The drive gear motor 14 is shielded by the cover 132 connected to the bottom of the weighing container 13. The mutual relationships regarding position and operation of the bottom of the weighing container 13, the second movable gate 18, the drive gear motor 14 for discharging granule, and the gear head 143 are respectively the same as for fixed gate 16, movable gate 17, drive gear motor 12 for feeding granule, and gear head 123. So when the discharge holes 131 and the openings 181 on the movable gate 18 (not shown in the drawing) are aligned, the granule passes through the discharge holes 131 and are is discharged from the weighing container.

With actual embodiment 2 of the weighing machine 11 of this invention, just as with actual embodiment 1 of the weighing machine 1, the granule fed into the weighing container 13 accumulate such that they form four low mounds. With actual embodiment 2, the mounds form around the perimeter of the rotation shaft. When the granule accumulates until they reach the vicinity of the edge of the feeder holes 161, the tops of the mounds are shaved off by the edges of the openings 171 in the movable gate 17 and the tops of the granule mounds in the weighing container are leveled off. This means that most of the effective capacity of the weighing container 13 is used to contain granule. The overall weighing machine 11 is thus designed to be thin. The feeder hole 161 can be fully opened or closed by rotating the movable gate 16 by only 45° C., enabling high-speed weighing. There is no limit to the number of feeder holes that can be used with actual embodiment 2 of this invention. If a weighing machine with N number of feeder holes 161 is used, the full opening and closing of said feeder holes can be accomplished by rotating the movable gate 16 by only 180° C./N.

The granule gate of this invention lowers the height of the mounds of granule that accumulate in granule weighing machines. It can also entirely open and close feeding holes using a short stroke. The granule weighing machine of this invention can be designed thin, so that the maximum quantity of granule to be weighed nearly matches the capacity of the weighing container.

What is claimed is:

1. A weighing machine for measuring the weight of granule, the machine comprising:

a weighing container for containing the granule;

a drive source;

a fixed gate fixed above the weighing container, the fixed gate having multiple feeder holes arranged such that granule can pass through;

a movable gate slidable across the fixed gate and positioned under the fixed gate to be exposed to the top of the weighing container, the movable gate having multiple openings spaced at the same pitch as the feeder holes, thereby allowing granule to pass through to be fed into the weighing container when said openings are aligned with said feeder holes and causing leveling of granule mound peaks when the weighing container is substantially filled; and a power transmission mechanism for transmitting a driving force from the drive source to slide the movable gate.

2. The machine according to claim 1, wherein a minimum interval D between adjacent openings on the movable gate is wider than a maximum width d of the corresponding feeder holes.

3. The machine according to claim 1, wherein the feeder holes are arranged in a straight line, the movable gate slides forward and backward in the direction of said lines, and the power transmission mechanism is a linkage.

4. The machine according to claim 1, wherein a bearing is attached to one of the fixed gate and the movable gate and a rail running over the bearing is attached to the other of the fixed gate and the movable gate.

5. The machine according to claim 1, wherein the feeder holes are arranged in a circular pattern and the movable gate slides in a rotating direction.

6. The machine according to claim 1, wherein the drive source is a motor.

* * * * *